US011000926B2

(12) United States Patent
Wilkins et al.

(10) Patent No.: US 11,000,926 B2
(45) Date of Patent: May 11, 2021

(54) FASTENER FEED HEAD (71) Applicant: Penn Automotive, Inc., Wilmington, DE (US)

(72) Inventors: Brian Wilkins, Clarkston, MI (US); John Ryan Taylor, Oxford, MI (US); Robert John Schafer, Swartz Creek, MI (US)

(73) Assignee: Penn Automotive, Inc., Waterford, MI (US)

( * ) Notice: Subject to any disclaimer, the term of this patent is extended or adjusted under 35 U.S.C. 154(b) by 155 days.

(21) Appl. No.: 15/849,638

(22) Filed: Dec. 20, 2017

(65) Prior Publication Data

US 2019/0184504 A1 Jun. 20, 2019

(51) Int. Cl.
*B23P 19/00* (2006.01)
*B23P 19/06* (2006.01)

(52) U.S. Cl.
CPC ........... *B23P 19/004* (2013.01); *B23P 19/001* (2013.01); *B23P 19/006* (2013.01); *B23P 19/062* (2013.01)

(58) Field of Classification Search
CPC ..... B23P 19/004; B23P 19/062; B23P 19/001; B23P 19/006
See application file for complete search history.

(56) References Cited

U.S. PATENT DOCUMENTS

| 3,089,360 | A | | 5/1963 | Steward |
| 3,114,477 | A | | 12/1963 | Dixon |
| 3,405,436 | A | | 10/1968 | Koett |
| 3,942,235 | A | | 3/1976 | Goodsmith |
| 4,003,417 | A | | 1/1977 | Cornwell |
| 4,442,965 | A | * | 4/1984 | Leistner ................... B25C 1/003 227/130 |
| 4,551,913 | A | | 11/1985 | Campisi |
| 4,784,026 | A | | 11/1988 | Kobayashi et al. |
| 5,273,200 | A | * | 12/1993 | Hoefler ................... B25C 1/003 227/119 |
| 5,339,983 | A | * | 8/1994 | Caple .................... B23P 19/001 221/104 |
| 5,566,446 | A | | 10/1996 | Luckhardt |
| 5,588,576 | A | | 12/1996 | Knetsch |
| 5,752,305 | A | | 5/1998 | Cotterill et al. |
| 6,578,258 | B1 | | 6/2003 | Boyer |

(Continued)

FOREIGN PATENT DOCUMENTS

KR 101149606 5/2012

*Primary Examiner* — Moshe Wilensky
*Assistant Examiner* — Kyle A Cook
(74) *Attorney, Agent, or Firm* — Gregory J. Gore, Esq.

(57) ABSTRACT

A fastener feed head includes a chute having a feed passage along a feed axis to support and guide fasteners from a chute inlet to a chute outlet connected to a fastener installation head. A carriage is movably attached to the chute along a feed axis. Opposed pawls are pivotably attached to the carriage. The carriage reciprocates along the feed axis between a retracted position and a feed position. The carriage cyclically advances a predetermined number of fasteners from a queue of fasteners in an upstream zone into a queue of fasteners in a downstream zone by: retracting to the retracted position from the feed position; abutting the lead fastener in the upstream queue with the pawls; and, driving the lead fastener with the pawls until the carriage reaches the feed position.

19 Claims, 11 Drawing Sheets

(56) References Cited

U.S. PATENT DOCUMENTS

| | | |
|---|---|---|
| 6,592,015 B1 | 7/2003 | Gostylla et al. |
| 6,944,944 B1 | 9/2005 | Craythorn et al. |
| 6,968,939 B1 | 11/2005 | Mauer et al. |
| 7,409,760 B2 | 8/2008 | Mauer et al. |
| 7,475,468 B2 | 1/2009 | Mauer et al. |
| 7,487,583 B2 | 2/2009 | Craythorn et al. |
| 7,849,579 B2 | 12/2010 | Craythorn et al. |
| 8,769,788 B2 | 7/2014 | Faitel et al. |
| 8,850,685 B2 | 10/2014 | Craythorn et al. |
| 9,352,383 B2 | 5/2016 | Craythorn et al. |
| 2003/0164381 A1* | 9/2003 | Goodsmith ........... B23P 19/006 221/268 |
| 2004/0181937 A1 | 9/2004 | Woods |
| 2005/0258185 A1 | 11/2005 | Vrana |
| 2008/0179372 A1 | 7/2008 | Kurth |
| 2014/0331474 A1* | 11/2014 | Walters, Jr. ............. B25C 1/005 29/432 |
| 2014/0367442 A1* | 12/2014 | Gadekar ................... B25C 5/11 227/82 |

* cited by examiner

FASTENER FEED HEAD

FIELD OF THE INVENTION

The present invention relates to apparata for feeding fasteners from a feed hopper to the head of a fastener installation device.

BACKGROUND OF THE INVENTION

Self-attaching fasteners are attachable to panels without welding. Examples of self-attaching fasteners include pierce and clinch studs, bolts, ball studs, pierce and clinch nuts and other female fasteners of this type. Self-attaching fasteners include a fastener portion, such as a threaded or unthreaded shank in the case of male fasteners, or a threaded or unthreaded bore in the case of female fasteners. Self-piercing fasteners have a barrel portion that pierces an opening in the panel. Self-clinching fasteners deform and clinch to the metal immediately surrounding a pre-formed opening in a panel.

Self-attaching fasteners are used in mass production of many products. In many cases, a self-attaching fastener may be installed in rapid succession from an automated installation head. Automatic systems are used to feed fasteners into the automated installation head. For example, in some existing automatic feed systems, which may be called "blow-feeders", pressurized air propels fasteners from a funnel-shaped hopper through a chute and into the installation head.

In some production applications, it is known and advantageous to "string" (or join) fasteners together using connection means such as wire, tape, or adhesive, and feed the fasteners into the installation apparatus. The fastener strip is typically supplied to the feed mechanism by way of a reel. The individual fasteners are joined together in a common orientation. The installation apparatus shears the connection means to release one of the fasteners from the fastener strip and join the fastener to a panel.

In another known fastener feed system, fasteners are fed into a die press capable of generating several tons of force. On the downward stroke, a punch separates the fastener from the fastener strip and forces the fastener through the panel. A die supports the panel and deforms the fastener, which causes the fastener to positively engage and retain the panel. On the upward stroke, the feed mechanism loads the next fastener beneath the punch ready for installation at the next location.

In another existing installation apparatus, unconnected, separate fasteners are sent from a hopper to the installation head via a chute with a cross-section that conforms to the shape of the fastener to prevent the fastener from tumbling. Such fasteners are propelled through the chute by pressurized air. The fasteners in such a system are presented to the feed head in a predetermined orientation for installation. One fastener is propelled through the chute per cycle of the installation head. If the chute is long, transfer of the fastener from the hopper to the installation head may be the rate determining step in the installation process. It may not be possible to run the installation head at a desired number of cycles per minute because the installation apparatus has to wait for the fasteners to feed.

SUMMARY OF THE INVENTION

The present invention relates to a fastener feed head for advancing fasteners from a feed hopper to an installation head. The feed head generally comprises a chute, a carriage movable between a retracted position and a feed position on the chute, and first and second opposed pawls pivotably attached to the carriage. The chute has an upstream zone proximate the chute inlet and a downstream zone proximate a chute outlet. The chute defines a feed passage along a feed axis, which supports and guides the fasteners from the chute inlet to the chute outlet connected to the fastener installation head.

The carriage is movable between a retracted position and a feed position on the chute. Preferably, the carriage cyclically advances a single fastener from a queue of fasteners in the upstream zone into a queue of fasteners in the downstream zone by: retracting from the feed position to the retracted position; abutting the lead fastener in the upstream queue with the pawls; and, driving the lead fastener with the pawls until the carriage reaches the feed position. When a lead fastener in the upstream zone is advanced into the downstream zone, the fastener in the downstream zone closes to the chute outlet is advanced out of the chute and into the installation head.

The pawls spread open when the carriage moves from the feed position to the retracted position. The pawls close intermediate the lead fastener and the second upstream fastener in the upstream queue when the carriage reaches the retracted position.

First and second opposed reaction bars are removably attached to the carriage. A pawl spring is disposed between each of the first and second pawls and each of the first and second reaction bars, respectively, to bias each pawl toward the chute. The pawls are symmetrically arranged on opposite sides of the chute and contact the fastener on opposed sides of the feed axis.

The carriage is movably attached to the chute by a slide mechanism. The chute includes first and second opposed sidewalls, each of which has an elongate body slot. Each sidewall also includes an elongate head slot parallel to the body slot.

Each pawl includes a hinge at one end, and a body indexing tine and a head indexing tine at the other end that extend through the body slot and head slot, respectively, in one of the chute sidewalls and into the feed passage. Each tine tine has an angular retraction chamfer and an angular contact face. The tines contact the fastener at spaced locations along the central axis of the fastener. The tines are equally spaced so that the pawls do not substantially rotate the lead fastener while driving the lead fastener from the upstream zone to the downstream zone.

The feed head includes a reciprocating cam, a cooperating cam follower on the carriage, and an advancement spring that normally biases the carriage toward the feed position. The cam drives the carriage toward the retraction position during a retraction stroke, and allows the carriage to move toward the feed position in a feed stroke. In one preferred embodiment, the advancement spring comprises a helical, compression spring and the cam follower comprises a cylindrical pin removably attached to the carriage perpendicular to the feed axis.

In a preferred embodiment, the fastener feed head includes a manual retraction mechanism attached to the carriage. The manual retraction mechanism comprises a retraction shaft and an anchor block fixed to the chute. Preferably, the advancement spring surrounds the shaft and is seated against the anchor block.

The fastener feed head may advance fasteners in the feed direction by: first retracting the retraction shaft against the biasing force of the advancement spring until the carriage reaches the retracted position; and, then releasing the retraction shaft to unoppose the biasing force of the advancement spring.

In a preferred embodiment, the carriage includes a cam relief portion to prevent contact between the cam and the carriage when the cam contacts the cam follower. Preferably the cam contacts the cam follower in the cam relief portion of the carriage.

The carriages is preferably connected to the chute by a slide mechanism. In one preferred embodiment, the slide mechanism includes a bearing rail connected co-axially to the chute. The slide mechanism may include a slide block engaged with the bearing rail.

In a preferred embodiment, the fastener feed head mechanically advances one fastener per stroke of the installation head from a queue of fasteners waiting in a chute. However, the feed head could be configured to advance a predetermined plurality of fasteners per stroke of the installation head.

Tests have shown that a faster cycle rate can be obtained with the feed head of the present invention compared to pneumatic feeders of the prior art. For example, the reliable, sustained maximum feed rate for a pneumatic feeder operating under comparable conditions to feed M8 sized fasteners to an operating installation head is about 25 parts per minute (ppm). A tested example of the present invention had a sustained maximum feed rate of greater than 37 ppm. Other advantages of the present invention will be apparent as the disclosure is described herein.

DETAILED DESCRIPTION OF PREFERRED EMBODIMENTS

Figure 1:
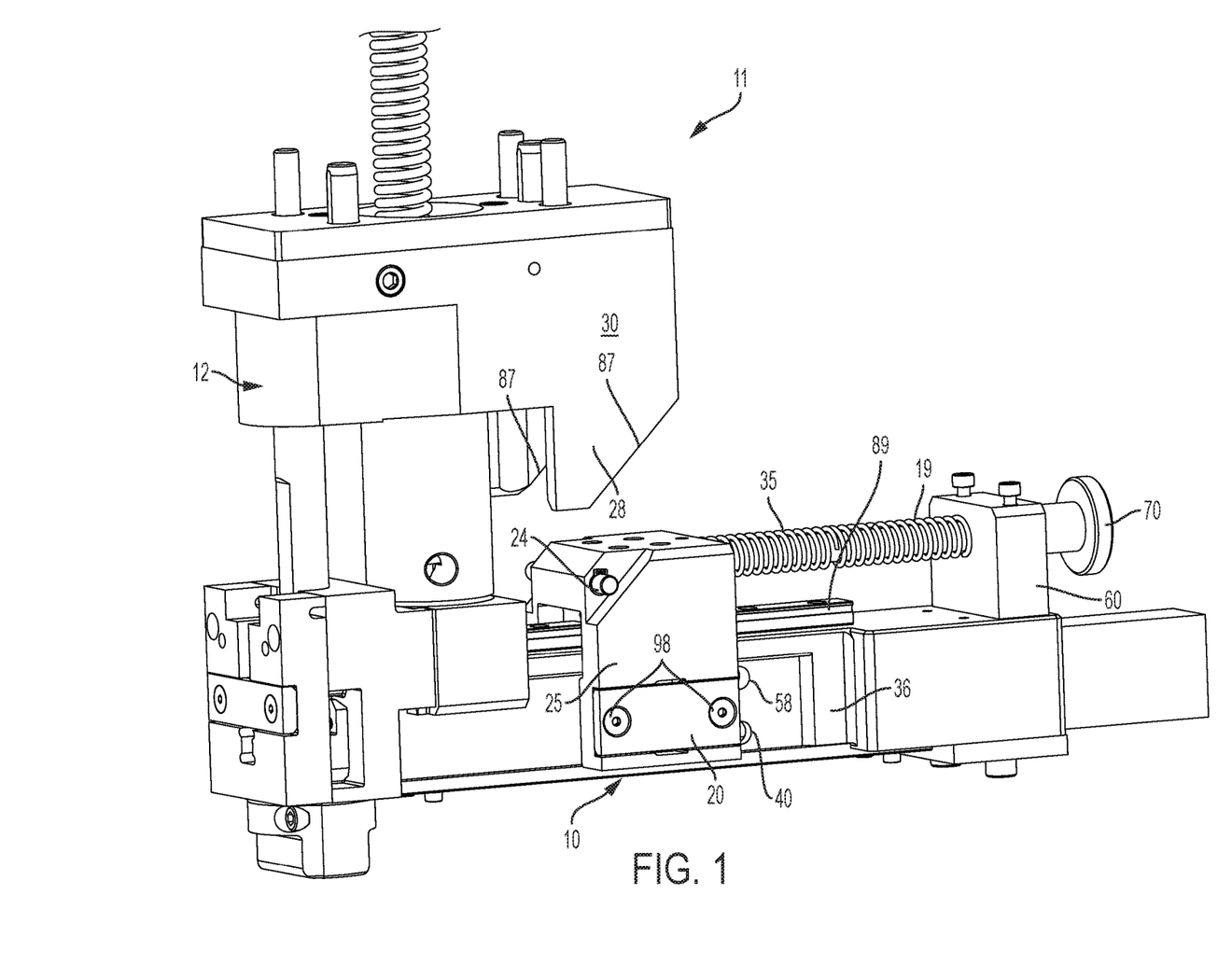
FIG. 1 is a perspective view of a fastener installation apparatus including an installation head coupled to a fastener feed head in accordance with a preferred embodiment of the present invention.
Figure 2:
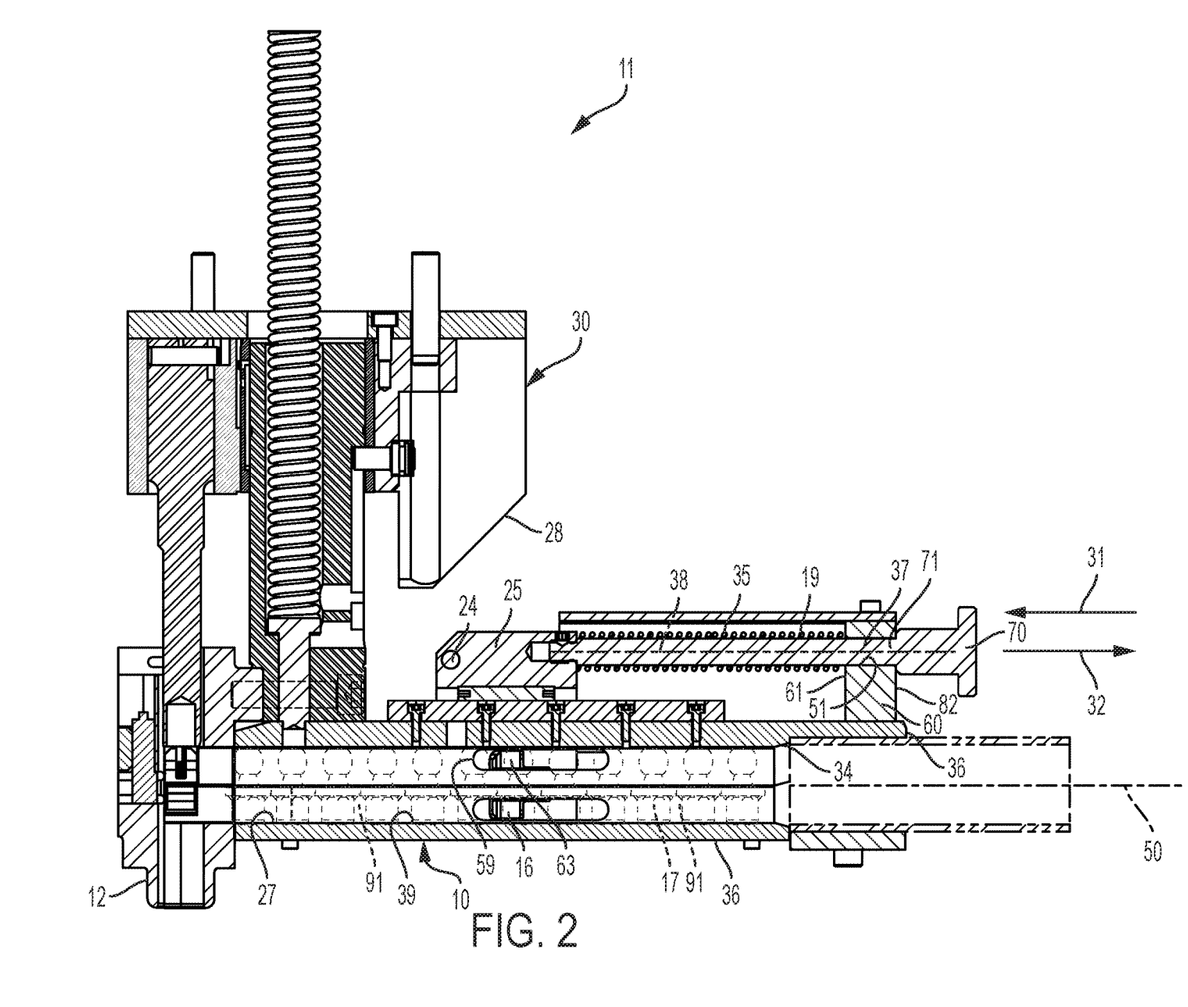
FIG. 2 is a cross section taken along lines 2-2 of FIG. 3.
Figure 3:
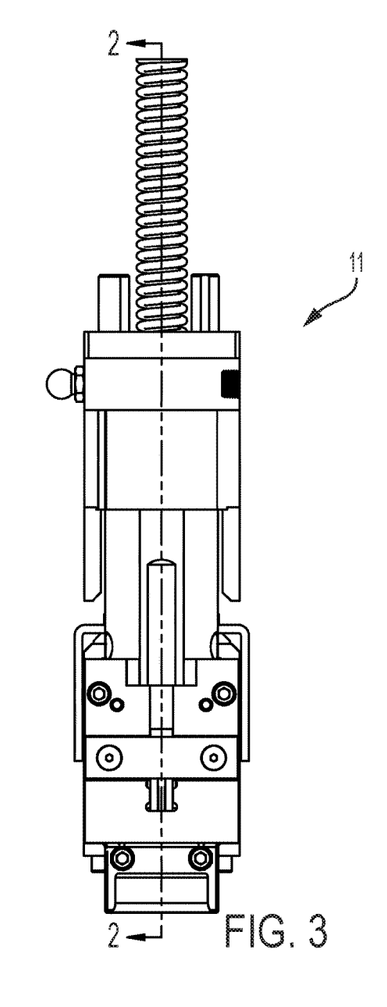
FIG. 3 is a front elevation of the fastener installation apparatus shown in FIG. 1.
Figure 4:
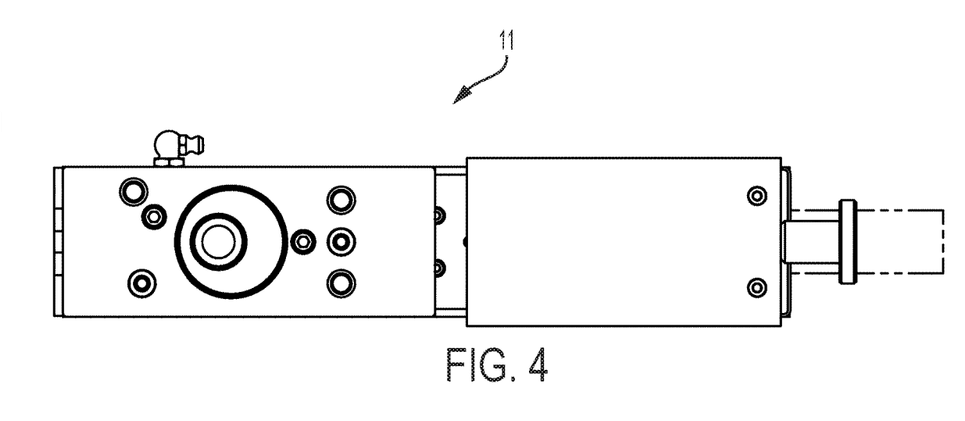
FIG. 4 is a top plan view of the fastener installation apparatus shown in FIG. 1.
Figure 6:
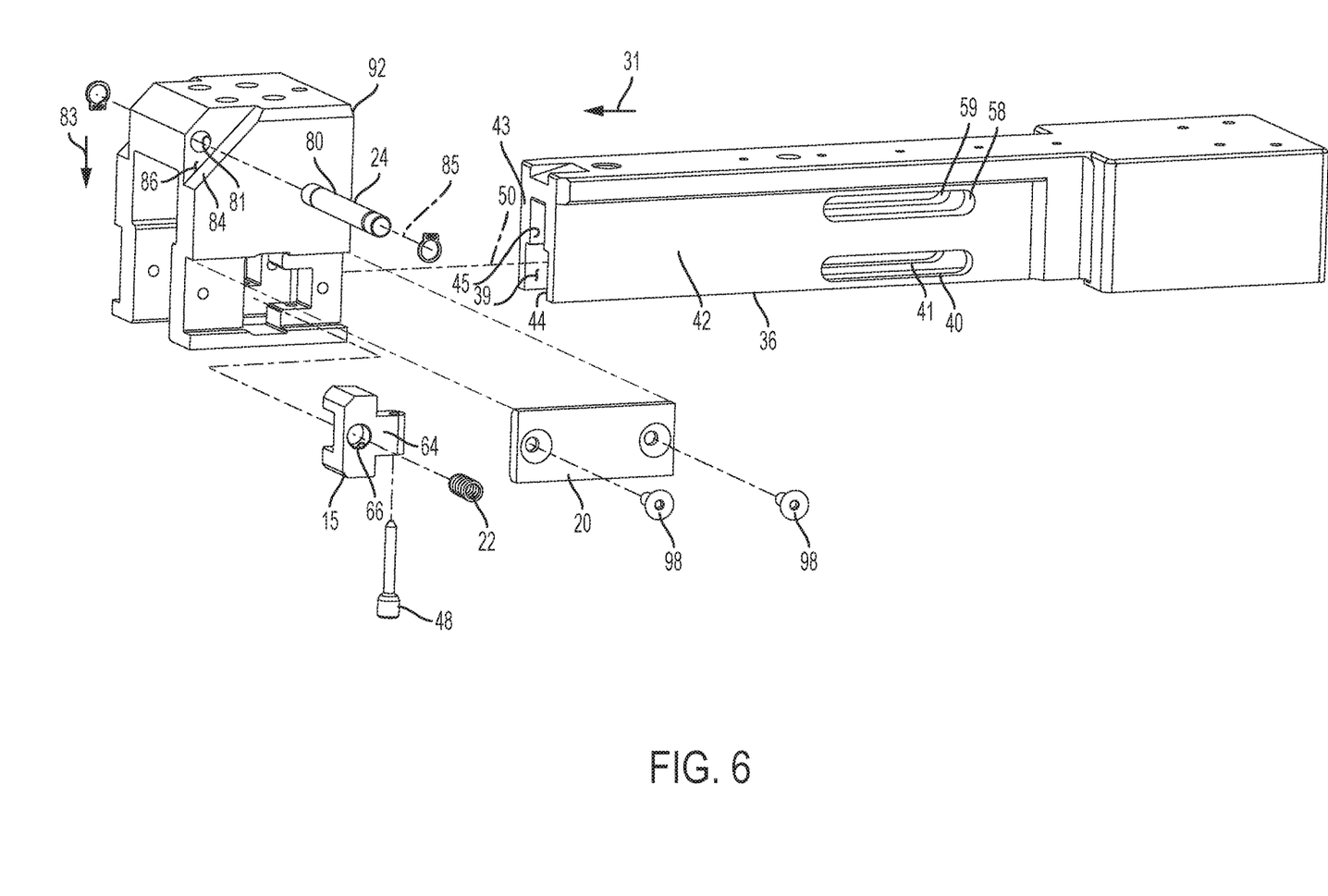
FIG. 6 is an exploded perspective of the carriage and chute of the fastener feed head shown in FIG. 1.

A fastener feed head in accordance with preferred embodiments of the invention is illustrated in the drawings and is designated generally by reference numeral 10. In the embodiments illustrated herein and described below, the fastener feed head 10 feeds fasteners 17 to the fastener installation head 12 of a fastener installation apparatus. Referring to FIGS. 1, 2 and 6, the fastener feed head 10 includes a chute 36 having a feed passage 39 with an upstream zone proximate the chute inlet 34, a downstream zone proximate the chute outlet 27, and a feed axis 50. The chute 36 supports and guides fasteners 17 from the chute inlet 34 to the chute outlet 27, which is connected to a fastener installation head 12. The fastener feed head 10 may be used to feed any self-attaching fastener including pierce and clinch studs, bolts, ball studs and the like, pierce and clinch nuts, and other female fasteners of this type. In the embodiment show in phantom in FIGS. 2, 8A, 9, and FIG. 10, the fasteners 17 are self-attaching ball studs 91.

Figure 5A:
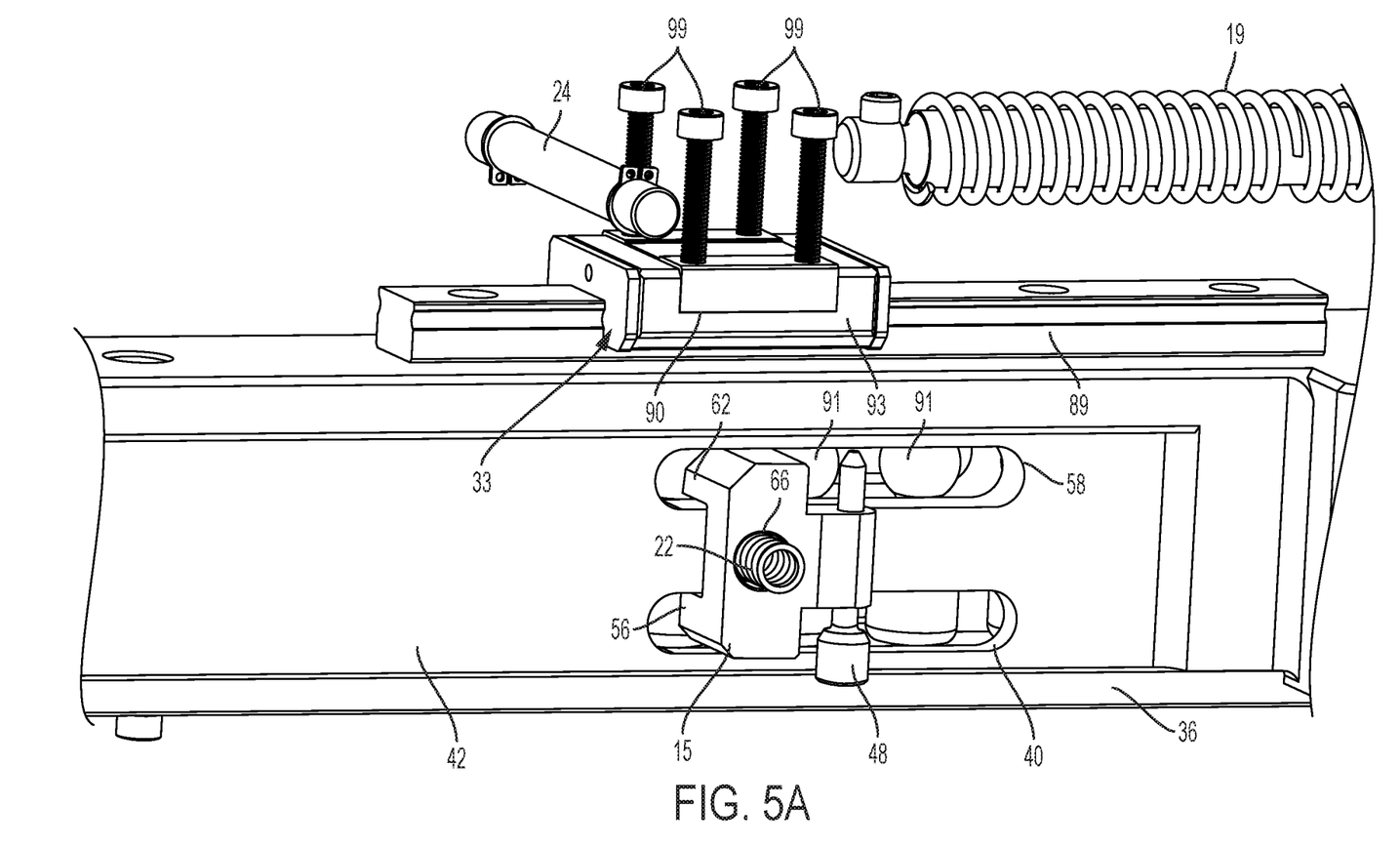
FIG. 5A is a fragmentary perspective of the fastener feed head shown in FIG. 1 with the carriage housing removed.
Figure 5B:
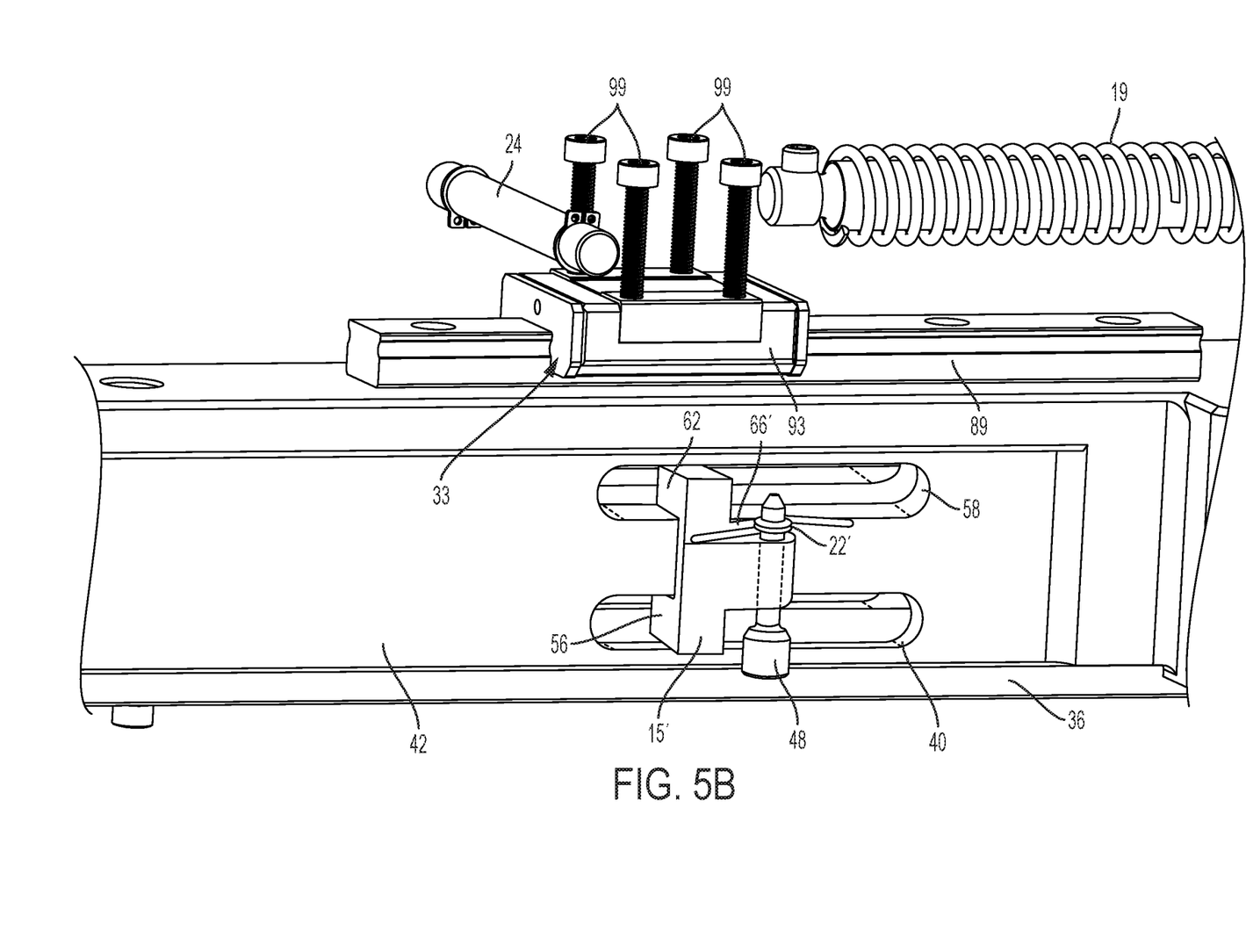
FIG. 5B is a fragmentary perspective of the fastener feed head in accordance with another embodiment with the carriage housing removed.

In a preferred embodiment depicted in FIG. 1, viewed together with FIGS. 5A and 6, a carriage 25 is movably attached to the chute 36 along a feed axis 50. In the preferred embodiment shown in FIG. 5A, the carriage 25 is movably attached to the chute 36 via a linear bearing 33. First and second pawls 15, 16 are pivotably attached to the carriage 25 as shown in FIGS. 5A and 5B, in which the carriage housing 92 is removed to reveal the pawls hidden thereby. In FIGS. 5A and 5B, the four bolts 99 are depicted in position to attach the carriage housing 92 to a linear bearing ball carriage block 90.

The pawls 15, 16 have a construction that is the mirror image of the other and are described below with this understanding. The carriage 25 reciprocates along the feed axis 50 between a retracted position 97 to a feed position 96. As used herein, the carriage is in the "retracted position" 97 when it is located at the maximum distance from the chute outlet 27, and in the "feed position" when it is located at the minimum distance from the chute outlet 27 as it reciprocates along the feed axis 50. Movement of the carriage 25 from the retracted position 97 toward the feed position 96 defines the feed direction 31. Conversely, movement of the carriage 25 from the feed position 96 toward the retracted position 97 defines the retraction direction 32. The distance between the retracted position 97 and the feed position 96 is at least the center to center distance of adjacent, contacting fasteners 17 in the chute 36.

Once primed, a queue of fasteners 29 is arranged along the length of the chute including both the upstream zone and downstream zone. The carriage 25 abuts the lead fastener in the upstream zone and drives it in the feed direction 31 into the downstream zone when the carriage 25 moves from the retracted position 97 to the feed position 96. As used herein, the "lead fastener" in the chute 36 is the fastener in the upstream zone that is closest to the chute outlet 27. Once the lead fastener is driven from the upstream zone to the downstream zone, the next succeeding fastener in the upstream zone becomes the lead fastener. As the carriage cycles, each fastener 17 in the upstream zone will, in turn, be the lead fastener 26 for one cycle of the fastener feed head 10. As used herein, the "upstream zone" means the portion of the chute between the pawls 15,16 and the chute inlet 31 when the carriage 25 is located in the feed position. The "downstream zone" means the portion of the chute between the pawls 15,16 and the chute outlet 27 when the carriage is located in the feed position. Using this frame of reference, each fastener 17 in the chute 36 has a downstream edge 94 facing the chute outlet 27 and an upstream edge 95 facing the chute inlet 34.

To advance the fasteners 17, the pawls 15, 16 cyclically open and close in synchronization with axial movement of the carriage 25 as shown in FIGS. 7a-e. With reference to the carriage 25 in the feed position shown in FIGS. 7a and 7b, the pawls 15, 16 initially spread open by sliding transversely and outwardly relative to the feed axis 50, when the carriage 25 moves axially from the feed position toward the retracted position. As described below, the shape of the pawls 15, 16 allows them to slide outwardly and along the downstream edge 94 of each fastener 17. The pawls 15,16 spread open in reaction to an opening force imparted by the lead fastener 18 contacting retraction chamfers 72, 73 on the pawls. The opening force opposes the bias of a pawl spring 22, 23 on each pawl. The pawls 15, 16 slide along and remain in contact with the lead fastener 18, the pawls 15, 16 but open enough for the lead fastener 18 to slide there between. To allow for manufacturing variation, the pawls 15, 16 are constructed to open wider than the diameter of the intended fastener and wider than necessary to pass the fasteners 17 between the pawls 15, 16.

Figure 7A:
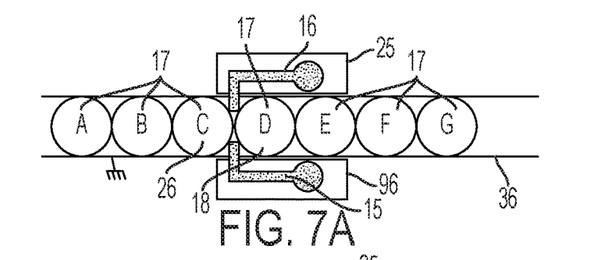
FIG. 7A-FIG. 7E are schematic illustrations of the reciprocating motion and feed cycle of the fastener feed head shown in FIG. 1.
Figure 7B:
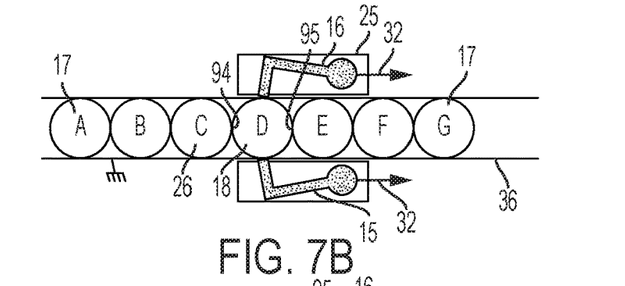
Figure 7C:
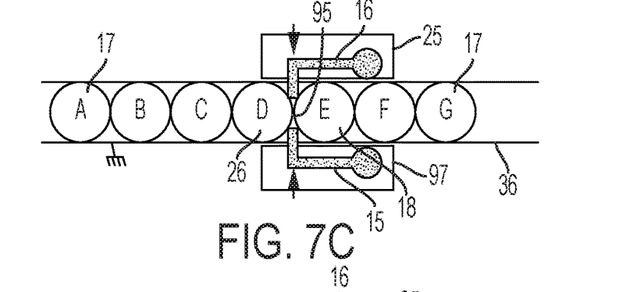

As the carriage approaches and then reaches the retracted position, the pawls 15, 16 begin to close by sliding transversely and inwardly along the upstream edge 95 of the fastener until the pawls are positioned intermediate the lead fastener 18 and the upstream-adjacent fastener as shown in FIG. 7c. The position of the carriage 25 in FIG. 7C illustrates the retracted position.

FIGS. 7A-7E schematically illustrate the reciprocating motion of the fastener feed head 10. A sampling of fasteners 17 are consecutively labeled "A", "B", "C" . . . "H". FIG. 7A illustrates the feed position 96 in which the pawls 15, 16 are closed. In FIG. 7A, the downstream queue of fasteners comprises fasteners "A", "B", and "C", the upstream queue of fasteners comprises fasteners "D"-"G", and fastener "D" is the lead fastener, also identified by reference numeral 18.

FIG. 7B illustrates the retraction movement of the carriage 25. During initial retraction, the pawls 15, 16 spread open and slide transversely on the lead fastener "D". The retraction movement continues until the first and second index ends 54, 55 of the pawls reach a location where the pawls can close between the lead fastener "D" and the upstream-adjacent fastener "E".

FIG. 7C schematically illustrates the retracted position. Note that the fasteners 17 do not move in the chute 36 as the carriage translates from the positions shown in FIGS. 7A, 7B, and 7C.

Figure 7D:
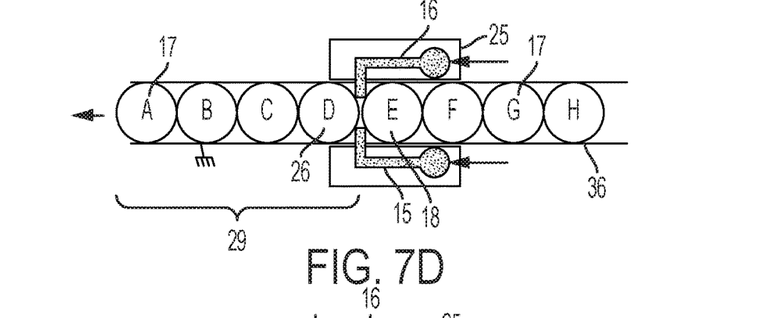

FIG. 7D illustrates the initial feed movement of the carriage 25. The pawls 15, 16 remain closed when the carriage 25 moves in the feed direction 31, thereby driving the lead fastener "D" downstream into the downstream zone and advancing the downstream queue of fasteners in the feed direction 31.

Figure 7E:
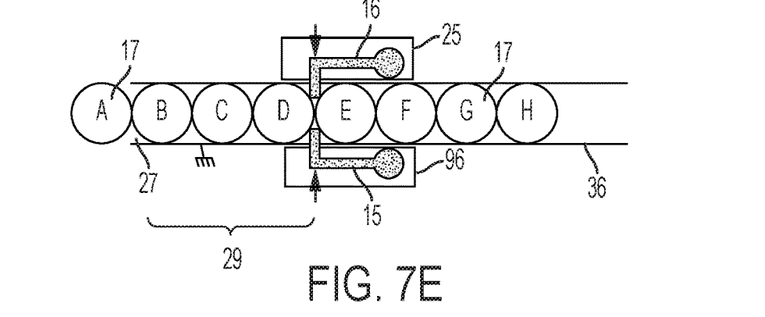

FIG. 7E illustrates completion of the feed movement and completion of the reciprocating cycle that began in FIG. 7A. The carriage 25 has returned to the feed position and fastener "A" has been fed past the chute outlet 27 to the fastener installation head 12. The downstream queue of fasteners now comprises fasteners "B", "C", and "D", the upstream queue comprises fasteners "E"-"H", and fastener "E" is the lead fastener 18.

Referring to FIGS. 1 and 6, a first reaction bar 20 is removably attached to the carriage 25 with two screws. However, the first reaction bar 20 may be removably attached by any suitable mechanism, including, for example: sliding the first reaction bar 20 into a slot defined in the carriage housing 92; clamping the reaction bar 20 onto the carriage housing 92; or retaining the reaction bar 20 on the carriage housing with quick release pins. A second reaction bar 21 is attached to the carriage 25 opposite the first reaction bar 20. The fastener feed head 10 is symmetrical about a vertical plane (vertical in the orientation shown in FIG. 1) including the feed axis 50. The opposite side of the fastener feed head 10 is not shown for brevity of description. The second reaction bar 21 (not visible in FIG. 1) is a mirror image of the first reaction bar 20.

A pawl spring is disposed between each pawl 15, 16 and it adjacent reaction bar 20, 21 to normally bias the pawl closed and in contact with the fasteners 17. In the embodiment shown in FIGS. 5A and 8A, the pawl spring 22, 23 comprises a helical compression spring. In the embodiment shown in FIGS. 5B and 8B, the pawl spring 22', 23' comprises a torsion spring. Except where noted otherwise, descriptions of the embodiment shown in FIGS. 1-5A, 6, and 8A-11A (the "compression spring" embodiment) also apply to the embodiment shown in FIGS. 5B, 8B and 11B (the "torsion spring" example).

Figure 8A:
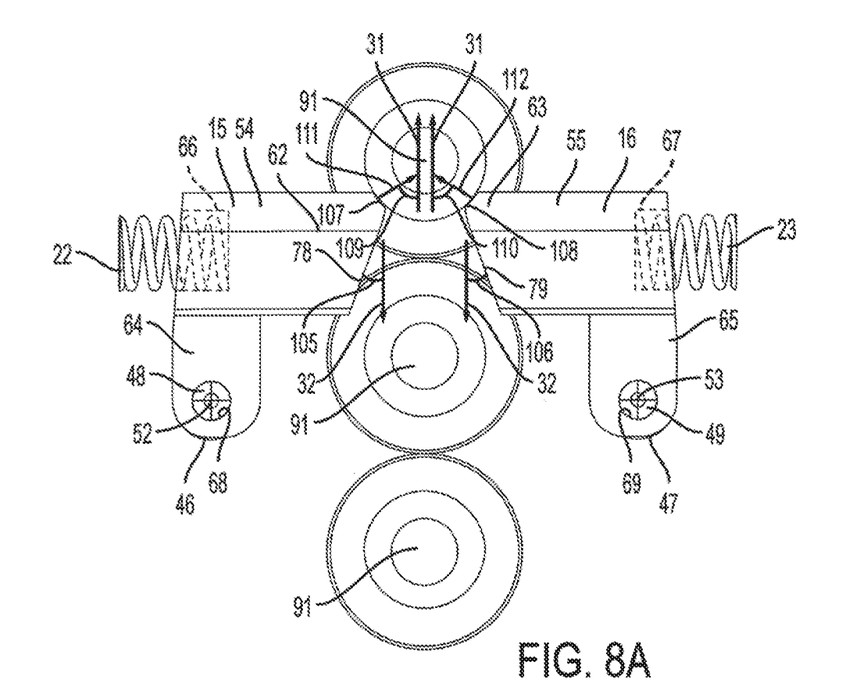
FIG. 8A is a top plan of a series of fasteners engaging the pawls in accordance with the embodiment shown in FIG. 5A.
Figure 8B:
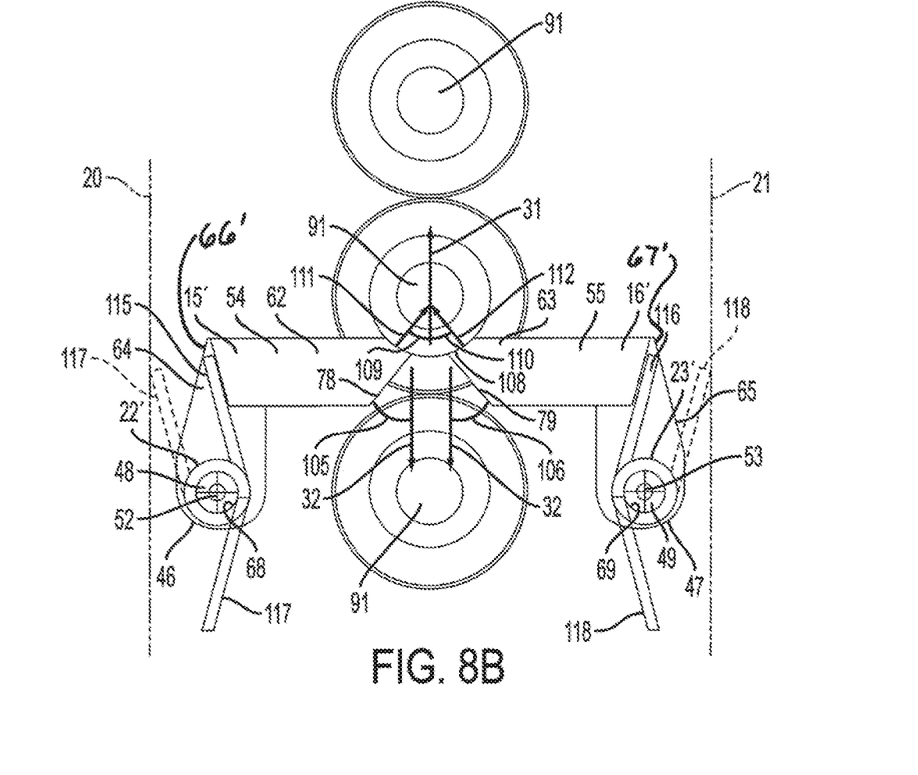
FIG. 8B is a top plan of a series of fasteners engaging the pawls in accordance with the embodiment show in in FIG. 5B.

Note that in FIG. 8B, the engaging legs 117, 118 of the pawl springs 22', 23' are shown in the free position in solid line, and are shown with torsion applied in hidden line. The reaction bars 20, 21 are represented by a phantom line in FIG. 8B. During installation, the engaging legs 117, 118 are wound to the position shown in hidden line and held in the wound state by the reactions bars 20, 21.

The chute 36 includes opposed sidewalls 42, 43 defining the feed passage 39. Referring to FIG. 6, opposed body slots 40, 41 extend through the sidewalls 42, 43 respectively. The chute 36 also includes opposed head slots 58, 59 that extend through the sidewalls 42, 43, respectively. In this embodiment, the head slots 58, 59 are parallel to the body slots 40, 41, respectively.

Each pawl 15, 16 has a hinged end 46, 47, which receive a hinge pin 48, 49, respectively, and an index end 54, 55 opposite the hinged end 46, 47, respectively. Each hinge pin 48, 49 has a hinge pin axis 52, 53 perpendicular to the feed direction 31, respectively.

Each pawl 15, 16 includes a body indexing tine 56, 57 and a head indexing tine 62, 63 defined at the first index end 54, 55, respectively. The body indexing tines 56, 57 extend through the body slots 40, 41 of the chute, respectively, and the head indexing tines 62, 63 extend through the head slots 58, 59, of the chute, respectively. The head indexing tines 62, 63 are parallel to and spaced apart from the body indexing tines 56, 57. The fastener feed head 10 is symmetrical about a vertical plane (vertical in the orientation shown in FIG. 1) through the feed axis 50. Therefore, the pawls and their relationship to the chute 36 are the mirror image of one another. The first pawl 15 and the second pawl 16 are symmetrical about the feed axis 50.

The body indexing tines 56, 57 and the head indexing tines 62, 63 preferably have a length that is complementary to the fastener 17 such that the fastener 17 substantially does not rotate in the chute 36. Substantially not rotating means that the fastener 17 does not rotate more than about 5 degrees in any direction. Without being held bound to any theory, it is believed that pitch rotation of the fastener 17 may be prevented by abutting the fastener 17 at two spaced locations along the longitudinal axis 113 of the fastener 17 with the fastener 17 in an unrotated orientation as shown in hidden line in FIG. 2. In the embodiment shown in the drawings, the fastener 17 is a self-attaching ball stud 91, and the two spaced locations are on the barrel portion 100 and the ball portion 114, respectively. As used herein, pitch rotation means rotation of the fastener 17 about a pitch axis perpendicular to the feed axis 50 and perpendicular to the longitudinal axis 113 of the fastener 17. Yaw rotation and roll rotation of the fasteners 17 are prevented by bi-lateral symmetry of the fastener feed head 10 about the vertical plane (as shown in FIG. 1) through the feed axis 50. As used herein, roll rotation means rotation of the fastener 17 about the feed axis 50 and yaw rotation means rotation of the fastener 17 about the longitudinal axis 113 of the fastener.

Referring to the embodiments shown in FIGS. 8A and 8B, each pawl has a pawl arm 64, 65 extending between the hinged end 46, 47 and the index end 54, 55, respectively. Each pawl arm 64, 65 has a hinged bore 68, 69 at the hinged end to receive the a hinge pin 48, 49, respectively. Each pawl also has a pawl spring receiver 66, 67 that receives a portion of the pawl spring 22, 23.

In the embodiment shown in FIG. 8A, the pawl spring receiver 66, 67 comprises bore (shown in hidden line) in the pawl arm 64. The pawl spring receiver 66, 67 retains at least a portion of the spring 22, 23 throughout a full range of motion of the pawls 15, 16 about the hinge pin 48, 49, respectively.

In the embodiment depicted in FIG. 8B, the pawl spring receiver 66', 67' simply comprises the wall of the pawl arms 64, 66. The pawl spring receiver 66', 67' abuts the spring pawl leg 115, 116, which applies force from the spring 22', 23' to bias the pawl 15', 16' toward the closed position, respectively. The hinge pin 48, 49 protrudes through the coiled portion of the spring 22', 23', respectively.

Figure 9:
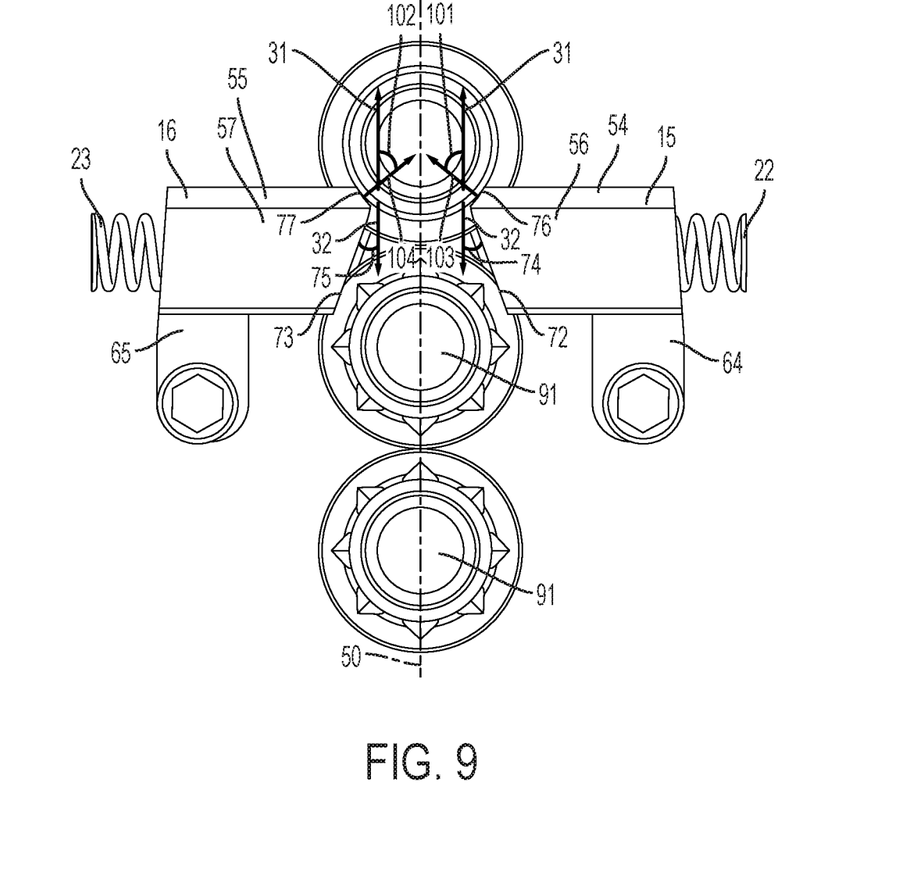
FIG. 9 is a bottom plan of a series of fasteners engaging the pawls in accordance with the embodiment shown in FIG. 5A.
Figure 10:
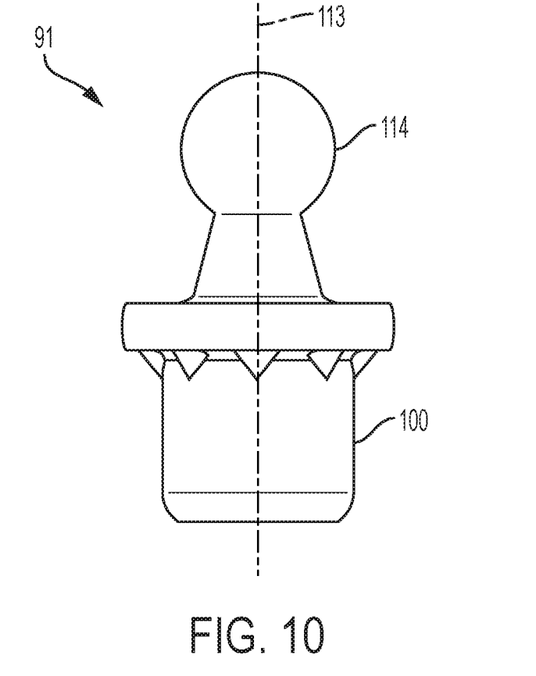
FIG. 10 is a side elevation of a self-attaching ball stud fastener that may be installed using the apparatus shown in FIG. 1.

Referring to FIG. 9, each body indexing tine 56, 57 and each head indexing tine 62, 63 has a retraction chamfer 72, 73 and 78, 79, respectively, oriented at a chamfer angle 74, 75 and 105, 106, respectively, defined between the retraction chamfer and the retraction direction 32 when the pawl arm 64, 65 is parallel to the retraction direction 32. Each body indexing tine 56, 57 and each head indexing tine 62, 63 also includes a feed contact face 76, 77 and 107, 108, respectively, oriented at a feed contact angle 101, 102 and 109, 110, respectively, defined by a resultant contact force 103, 104 exerted by the feed contact faces, which is exerted by the body indexing tines through the feed contact faces on the fasteners. The feed contact angle 101 is measured from the feed direction 31. Since there are two angles defined by the intersection of two lines, as used herein, the feed contact angle 101, 102, 109, 110 means the smallest magnitude angle between the resultant contact force 103, 104, 111, 112 and the feed direction 31.

In the embodiment illustrated in FIG. 9, the resultant contact force 103, 104 urges the pawls 15, 16 to rotate against the bias of the pawl springs 22, 23. Thus, if the springs 22, 23 were removed, the pawls 15, 16 would open and not return to the closed position when the carriage 25 cycles between the feed and retraction position.

The feed contact faces 76, 77, 107, 108 may have any suitable contour such as flat or complementary to the contact surface of the fastener. In a preferred embodiment, the feed contact faces 76, 77, 107, 108 have a radius that matches the corresponding radius of the fasteners. Note that the fasteners are centered on the feed axis 50; therefore, the radius of the feed contact faces is centered on the feed axis.

The retraction chamfer angles 74, 75, 105, and 106 are small enough so that when the carriage 25 is driven in the retraction direction 32 by the cam 28 and cam follower 24, contact with the lead fastener produces a force that opens the pawls 15, 16 without driving the lead fastener and the other upstream fasteners in the retraction direction 32. In one preferred embodiment, the retraction chamfer angles 74, 75, 105 and 106 are each about 20 degrees.

In the embodiments shown in FIGS. 8A and 8B, the feed contact angles 101, 102, 109 and 110 are arranged such that the reactions to the resultant contact forces 103, 104, 111, 112 do not overcome the force of the springs 22, 22', 23, 23', respectively. Therefore, when the carriage 25 is driven in the feed direction 31, the resultant contact forces 103, 104, 111, 112 drive the lead fastener and the downstream queue of fasteners in the feed direction 31 without opening the pawls 15, 16.

As used herein, the term "close" when referring to the pawls 15,16 means that the opposed index ends 54, 55 move toward each other as far as possible without permanently deforming any of the components of the fastener feed head 10. When closed, the pawls 15, 16 may contact a hard stop that prevents further rotation towards closure. For example, the pawls may contact the sidewall 42, 43 of the chute 36. In that case, the sidewalls would be the hard stop that prevents further rotation towards closure. The full range of motion of the pawls 15, 16 is defined between the closed position and the full open position. As used herein, "open" means the opposite of "close". The full open position of the pawls 15, 16 is defined by the position of the pawls 15, 16 when the pawls are rotated away from the closed position and abut a hard stop. For example, the hard stop may be the spring 22, 23 compressed to a solid height. In another example, the hard stop may be the pawls 15', 16' contacting the reaction bar 20, 21.

In a preferred embodiment, the carriage 25 includes a cam follower 24 engaged by a cam 28, which is attached to a reciprocating portion 30 of the fastener installation head 12. The cam 28 contacts the cam follower 24 and moves the carriage 25 in the retraction direction 32 during a retraction stroke. The retraction movement of the carriage 25 compresses a product advancement spring 35, which normally biases the carriage 25 in the feed direction 31 to maintain the cam follower 24 in contact with the cam 28. The cam follower 24 moves parallel to the feed axis 50. If the cam is retracted vertically out of reach of the cam follower 24, contact between the cam follower 24 and the cam 28 may be temporarily interrupted.

The product advancement spring 35 may be a helical spring 19, or any suitable resilient member, such as shown in FIG. 2. A manual retraction shaft 37 may be attached to the carriage 25 and disposed coaxially to a helical axis 38 of the helical spring 19. The manual retraction shaft 37 is disposed through a guide bore 51 extending through an anchor block 60 fixedly-attached to the chute 36. The helical spring 19 contacts a downstream side 61 of the anchor block 60. A knob 70 may be fixedly attached to a free end 71 of the manual retraction shaft 37 on an upstream side 82 of the anchor block 60.

In a preferred embodiment, the fastener feed head 10 can advance fasteners 17 in the feed direction 31 by first retracting the knob 70 until the carriage 25 reaches the retracted position 97 and the pawls 15, 16 close, and then releasing the knob 70 thereby unopposing the biasing force of the product advancement spring 35 to move the carriage 25 in the feed direction 31. The pawls 15, 16 remain closed when the carriage 25 moves in the feed direction 31, thereby urging the lead fastener and the downstream queue of fasteners 17 in the feed direction 31.

In one preferred embodiment, the cam follower 24 is a cylindrical pin 80 removably attached to the carriage 25 through a bore 81 in the carriage 25. The pin 80 is oriented perpendicular to the feed direction 31 and perpendicular to a stroke direction 83 of the reciprocating portion 30 of the fastener installation head 12.

Referring to FIG. 6, the carriage 25 may further include a cam relief 84 to prevent contact between the cam 28 and surfaces of the carriage 25 other than the pin 80. The pin 80 protrudes outwardly along a cylindrical axis 85 into a cam relief space 86 defined in part by the cam relief 84. As best seen in FIG. 1, the cam 28 may have two cam surfaces 87 to simultaneously engage opposite ends 88 of the pin 80.

In the embodiment shown in FIGS. 1 and 5A, a linear bearing rail 89 is removably attached to the chute 36. A linear bearing ball carriage block 90 is removably attached to the carriage 25. A linear slider bearing 93 may be removably attached to the carriage 25. The linear slider bearing 93 may have a similar external appearance to the linear bearing ball carriage block 90; however, rather than having ball bearings, friction reducing materials or lubricants may be used to allow the linear slide bearing to easily slide along the feed axis 50.

Figure 11A:
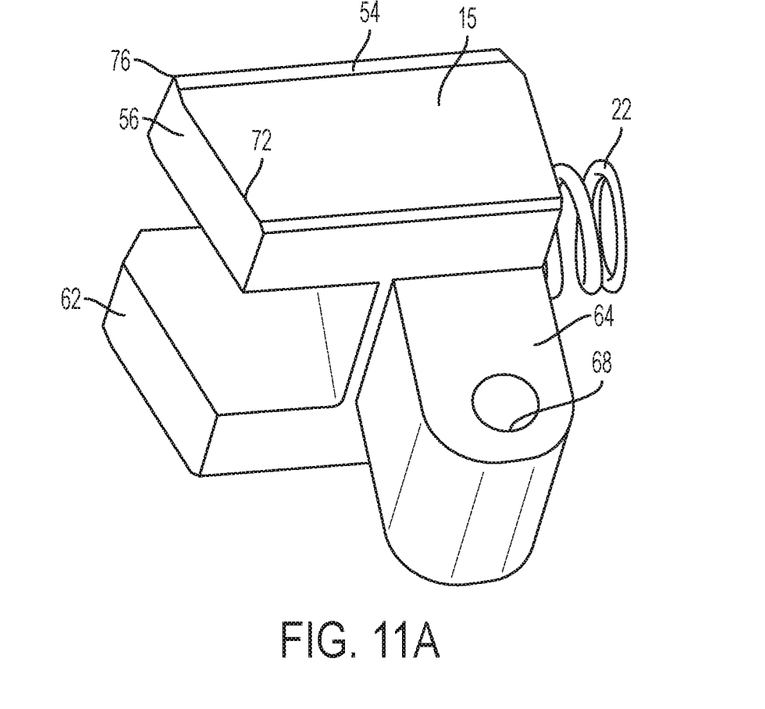
FIG. 11A is a perspective of the first pawl and helical compression spring in accordance with the embodiment shown in FIG. 5A; and, FIG. 11B is a perspective of the first pawl and helical compression spring in accordance with the embodiment shown in FIG. 5B.

FIG. 11A is a bottom perspective of one pawl 15 and compression spring 22 from the fastener feed head 10 shown in FIG. 1. The head indexing tine 62 is parallel to the body indexing tine 56. The true shape of the feed contacting face 76 is not visible from this view. The index end 54 is shown on the end of the pawl 15 opposite the hinge bore 68.

Figure 11B:
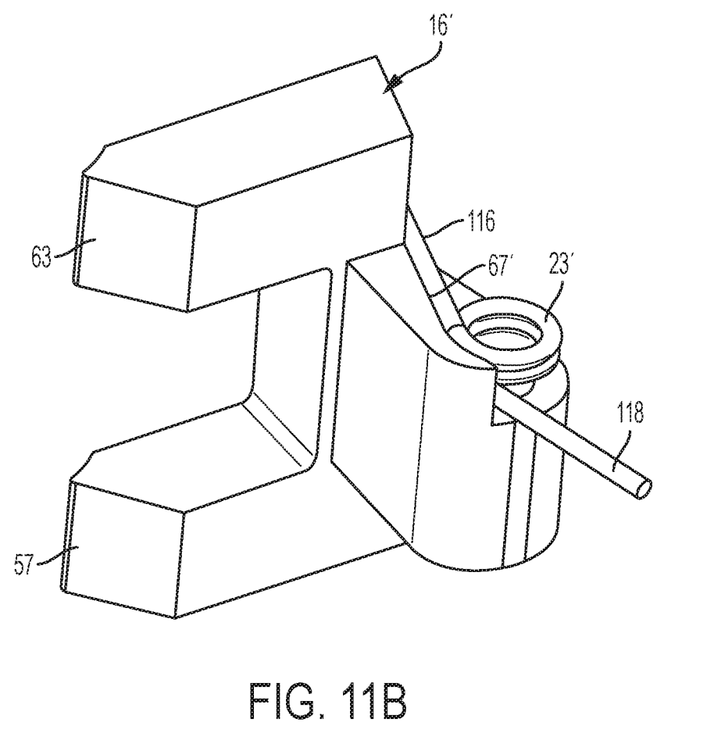

FIG. 11B is a top perspective of the second pawl 16' and the torsion spring 23' shown in FIG. 5B. The head indexing tine 63 is parallel to the body indexing tine 57. The torsion spring 23' is shown in the free state. As shown in FIG. 11B, the spring 23' is configured to have a free position ranging from about 150 degrees to about 170 degrees. When installed, the spring 23' is wound to about 300 degrees and the spring reaction bar engaging leg 118 is held in place by the reaction bar 21.

The fastener feed head has been described above with reference to embodiments configured to feed a single fastener to the fastener installation device per stroke of the carriage. However, it should be appreciated that the fastener feed head could be configured to feed a predetermined plurality "N" of fasteners to a fastener installation device by lengthening the stroke of the carriage. In this case, the carriage would retract further and the pawls would open around and slide over more than one fastener before closing around the "Nth" fastener measured from lead fastener in the upstream zone.

It is to be understood that disclosure of any ranges herein is for convenience and brevity and should be interpreted flexibly to include not only the numerical values explicitly recited as the limits of the range, but also to include all the individual numerical values or sub-ranges encompassed within that range as if each numerical value and sub-range is explicitly recited. Furthermore, when "about" or "approximately" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other examples. In addition, it is to be understood that the elements for any example may be combined in any suitable manner in the various embodiments unless the context clearly dictates otherwise.

While several embodiments have been described in detail, it is to be understood that the disclosed embodiments may be modified. Therefore, the foregoing description is to be considered non-limiting.

The invention claimed is:

1. A fastener feed head for advancing fasteners from a feed hopper to an installation head, comprising:
   a chute having an upstream zone and downstream zone, and defining a feed passage along a feed axis, which supports and guides the fasteners from a chute inlet to a chute outlet connected to the fastener installation head;
   a carriage movable between a retracted position and a feed position on said chute; and,
   first and second opposed fastener-advancing pawls on the carriage for driving the fasteners toward the chute outlet, said pawls pivotably attached to the carriage;
   wherein the carriage cyclically advances a predetermined number of fasteners from a queue of fasteners in the upstream zone into a queue of fasteners in the downstream zone by: retracting to the retracted position from the feed position; abutting a lead fastener in the upstream queue with the pawls; and, driving the lead fastener with both pawls until the carriage reaches the feed position;
   wherein said carriage is movably attached to said chute by a slide mechanism, and said chute includes first and second opposed sidewalls, each having two elongate slots, a body slot and a head slot;
   each sidewall of said chute includes said head slot parallel to said body slot; and each pawl includes a head indexing tine that extends through one of said head slots and into said feed passage; and
   wherein each pawl includes a hinge at one end, and a body indexing tine at the other end that extends through one of said body slots and into said feed passage.

2. The fastener feed head recited in claim 1, wherein said slide mechanism includes a bearing rail connected co-axially to said chute.

3. The fastener feed head recited in claim 2, wherein said slide mechanism includes a slider block engaged with said bearing rail.

4. The fastener feed head recited in claim 1 wherein:
   the pawls have directly opposing chamfers that spread open each pawl simultaneously by sliding contact with the lead fastener when the carriage initiates movement from the feed position to the retracted position; and
   the pawls close intermediate the lead fastener and a second upstream fastener when the carriage reaches the retracted position.

5. The fastener feed head recited in claim 4, further comprising:
   first and second opposed reaction bars attached directly to the carriage; and,
   a spring disposed between each of the first and second pawls and each of the first and second reaction bars, respectively, to bias each pawl toward the chute.

6. The fastener feed head recited in claim 5, wherein each pawl has a pawl arm with a hinge bore and a receiver engaged with a portion of one of said springs.

7. The fastener feed head recited in claim 6, wherein each of said body indexing tines has an angular retraction chamfer and an angular contact face.

8. The fastener feed head recited in claim 4, wherein said pawls are symmetrically arranged on opposite sides of said chute being mirror images of one another and contact the lead fastener on opposed sides of said feed axis.

9. The fastener feed head recited in claim 8, wherein each of said pawls include a plurality of said tines which contact said lead fastener at spaced locations along a central axis of the fastener.

10. The fastener feed head recited in claim 9, wherein said tines are equally spaced so that the pawls do not substantially rotate the lead fastener while driving the lead fastener from the upstream zone to the downstream zone.

11. The fastener feed head recited in claim 4, including a reciprocating cam, a cooperating cam follower on said carriage, and an advancement spring that normally biases said carriage toward the feed position, wherein said cam drives said carriage toward the retraction position during a retraction stroke, and allows said carriage to move toward the feed position during a feed stroke.

12. The fastener feed head recited in claim 11, wherein said cam follower comprises a cylindrical pin removably attached to said carriage perpendicular to the feed axis.

13. The fastener feed head recited in claim 12, wherein said carriage includes a cam relief portion to prevent contact between said cam and said carriage when said cam contacts said cam follower.

14. The fastener feed head recited in claim 13, wherein said cam contacts said cam follower in the cam relief portion of said carriage.

15. The fastener feed head recited in claim 11, wherein said advancement spring comprises a helical, compression spring.

16. The fastener feed head recited in claim 15, further comprising a manual retraction mechanism attached to said carriage.

17. The fastener feed head recited in claim 16, wherein said manual retraction mechanism comprises a retraction shaft and an anchor block fixed to said chute, and wherein said advancement spring surrounds said shaft and is seated against said anchor block.

18. The fastener feed head recited in claim 17, wherein the fastener feed head advances fasteners in a feed direction by first retracting said retraction shaft against a biasing force of said advancement spring until said carriage reaches the retracted position, and then releasing said retraction shaft unopposing the biasing force of said advancement spring.

19. A fastener installation apparatus, comprising
a) a fastener installation head;
b) a feed head for advancing fasteners from a feed hopper to said installation head, including:
   i) a chute having an upstream zone, a downstream zone, and a feed passage along a feed axis, which supports and guides the fasteners from a chute inlet to a chute outlet connected to said fastener installation head;
   ii) a carriage movable between a retracted position and a feed position on said chute; and
   iii) first and second opposed pawls on the carriage for driving the fasteners toward the chute outlet, said pawls pivotably attached to said carriage wherein said carriage cyclically advances a predetermined number of fasteners from a queue of fasteners in the upstream zone into a queue of fasteners in the downstream zone by: retracting to the retracted position from the feed position; abutting a lead fastener in the upstream queue with the pawls; and, driving the lead fastener with both said pawls until said carriage reaches the feed position, wherein said carriage is movably attached to said chute by a slide mechanism, and said chute includes first and second opposed sidewalls, each having two elongate slots, a body slot and a head slot;
each sidewall of said chute includes said head slot parallel to said body slot; and each pawl includes a head indexing tine that extends through one of said head slots and into said feed passage; and
wherein each pawl includes a hinge at one end, and a body indexing tine at the other end that extends through one of said body slots and into said feed passage.

\* \* \* \* \*